(12) United States Patent
Mitschker et al.

(10) Patent No.: US 12,235,993 B2
(45) Date of Patent: Feb. 25, 2025

(54) ADAPTIVE PII OBSCURING BASED ON PII NOTIFICATION VISIBILITY RANGE

(71) Applicant: FORD GLOBAL TECHNOLOGIES, LLC, Dearborn, MI (US)

(72) Inventors: Katharina Ines Mitschker, Cologne (DE); David Michael Herman, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 226 days.

(21) Appl. No.: 18/188,143

(22) Filed: Mar. 22, 2023

(65) Prior Publication Data
US 2024/0320364 A1 Sep. 26, 2024

(51) Int. Cl.
*G06F 21/62* (2013.01)

(52) U.S. Cl.
CPC ................ *G06F 21/6245* (2013.01)

(58) Field of Classification Search
CPC .................................................. G06F 21/6245
See application file for complete search history.

(56) References Cited

U.S. PATENT DOCUMENTS

| | | | |
|---|---|---|---|
| 9,830,505 B2 | 11/2017 | Fithian et al. | |
| 10,311,249 B2 | 6/2019 | Sharifi et al. | |
| 10,839,104 B2 | 11/2020 | Balzer et al. | |
| 11,321,487 B2 | 5/2022 | Kwatra et al. | |
| 2013/0201051 A1* | 8/2013 | Kreter | G01S 13/91 342/52 |
| 2020/0218910 A1* | 7/2020 | Herman | B60R 1/27 |

FOREIGN PATENT DOCUMENTS

CN 103688245 A 3/2014

OTHER PUBLICATIONS

Signal webpage, Mobile Application Speak Freely, retrieved from https://signal.org/en on Mar. 22, 2023.

* cited by examiner

*Primary Examiner* — Simon P Kanaan
(74) *Attorney, Agent, or Firm* — Joseph Zane; Brooks Kushman P.C.

(57) ABSTRACT

Captured PII is identified in sensor data, the sensor data being captured over time by a sensor of a vehicle of an environment surrounding the vehicle. The sensor data includes captured PII and non-PII. A notice zone surrounding the vehicle is identified, the notice zone defining an area in which a notice device of the vehicle provides notice to pedestrians that the sensor data is being captured. Any instances of the captured PII in the sensor data are obscured that are captured from the pedestrians that, over the time of the capture, did not enter the notice zone and receive the notice. The sensor data, as processed, is sent to a cloud server for storage.

20 Claims, 9 Drawing Sheets

ADAPTIVE PII OBSCURING BASED ON PII NOTIFICATION VISIBILITY RANGE

TECHNICAL FIELD

Aspects of the disclosure relate to the removal of personally identifiable information (PII) based on notice visibility.

BACKGROUND

PII includes many forms of information that could identify a human being. PII may include textual information such as names, addresses, and birth dates. PII may include other information as well, such as photographs of people, house addresses, or vehicle license plates. Data analytics may require the use of large sets of collected data. These data sets may include PII.

SUMMARY

In one or more illustrative examples, a vehicle for handling PII in data streams, includes a sensor configured to capture sensor data over time of an environment surrounding the vehicle, the sensor data including captured PII and non-PII; a notice device configured to provide notice to pedestrians that the sensor data is being captured; and a processor, in communication with the sensor and the notice device, programmed to identify the captured PII in the sensor data, identify a notice zone surrounding the vehicle in which the notice device provides the notice, obscure any instances of the captured PII in the sensor data captured from the pedestrians that, over the time of the capture, did not enter the notice zone and receive the notice, and send the sensor data, as processed, to a cloud server for storage.

In one or more illustrative examples, a method for handling PII in data streams, includes identifying captured PII in sensor data, the sensor data being captured over time by a sensor of a vehicle of an environment surrounding the vehicle, the sensor data including captured PII and non-PII; identifying a notice zone surrounding the vehicle, the notice zone defining an area in which a notice device of the vehicle provides notice to pedestrians that the sensor data is being captured; obscuring any instances of the captured PII in the sensor data captured from the pedestrians that, over the time of the capture, did not enter the notice zone and receive the notice; and sending the sensor data, as processed, to a cloud server for storage.

In one or more illustrative examples, a non-transitory computer-readable medium includes instructions for handling PII in data streams that, when executed by a controller of a vehicle, cause the controller to perform operations including to utilize a sensor to capture sensor data over time of an environment surrounding the vehicle, the sensor data including captured PII and non-PII; utilize a notice device to provide notice to pedestrians that the sensor data is being captured; identify the captured PII in the sensor data; identify a notice zone surrounding the vehicle in which the notice device provides the notice; obscure any instances of the captured PII in the sensor data captured from the pedestrians that, over the time of the capture, did not enter the notice zone and receive the notice; and send the sensor data, as processed, to a cloud server for storage.

DETAILED DESCRIPTION

Figure 1:
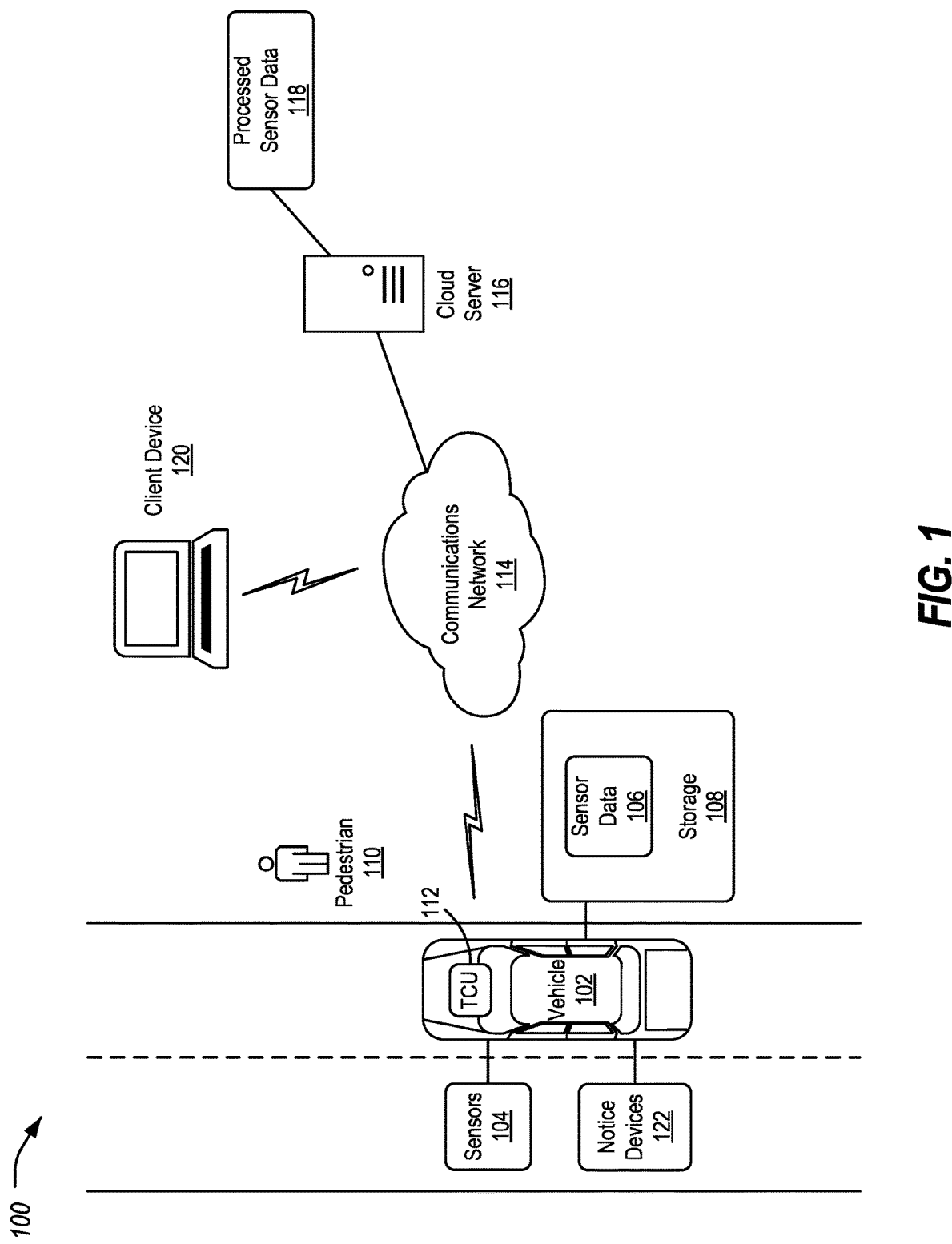
FIG. 1 illustrates an example system for the acquisition of data and adaptive obscuring of PII based on data collection notice.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicles may include external cameras to provide data to driver assistance or autonomous driving vehicle systems. These cameras may capture PII of pedestrians or other individuals outside the vehicle. It should be noted that camera images are an example, and other data may be used, such as captured audio, location information, date and time information, vehicle control inputs, vehicle speed or other operational parameters, etc. Further, vehicle data may be combined or processed in such a way as to produce PII such as taking a sequence of images to detect an individual's gait.

It may be useful to collect data to deliver features to customers, as well as to develop and debug the driver assistance or autonomous driving vehicle systems. For some events, it may be helpful to have the vehicle share collected vehicle data with a cloud service for providing features or for debugging the features. However, this sharing may raise PII and/or privacy issues. For instance, the transfer of this data may create burdens with privacy laws or rules, which may vary across jurisdictions. If the PII is simply removed from the image data, such as via blurring or redaction, then the image may no longer be useful for debugging purposes or for providing value to customers.

A vehicle may be configured to notify pedestrians or other persons outside the vehicle that the vehicle is recording data. In an example, signage may be placed on the exterior of the vehicle stating that sensor data is being recorded. In another example, one or more screens of the vehicle may display a message indicating the sensor data is being recorded. In a further example, a vehicle may use speakers to provide an audible message indicating that the sensor data is being recorded. However, an individual may be too far from the vehicle to see or hear the notification but still within the data capture area of the vehicle. In such a situation, the vehicle may still be capturing data around the vehicle, allowing pedestrian identification at a distance beyond which the pedestrian can receive the notice.

To address these issues, the vehicle may identify a notice range within which pedestrians may be notified that the vehicle is capturing data. If any PII is captured by the sensors for pedestrians outside the notice range, the vehicle may blur or otherwise obscure that PII. If PII is captured for pedestrians that have entered the notice range, then the PII may be allowed to remain in the data. The vehicle may the save and/or transmit the sensor data containing the appropriately notified or obscured PII data.

FIG. 1 illustrates an example system 100 for the acquisition of data and adaptive obscuring of PII based on data collection notice. In such a system 100, a vehicle 102 may utilize one or more sensors 104 to capture sensor data 106 including PII and non-PII. The vehicle 102 may include a storage 108 configured to maintain the sensor data 106. The sensor data 106 may include data that captures PII and non-PII of pedestrians 110. The vehicle 102 may also include a telematics control unit (TCU) 112 configured to communicate over a communications network 114 with a cloud server 116. The cloud server 116 may maintain processed sensor data 118 for use by client devices 120. The vehicle 102 may also include one or more notice devices 122 configured to inform the pedestrians 110 of the capturing of the sensor data 106. It should be noted that the system 100 is only an example, and systems 100 having more, fewer, or different elements may be used. For instance, while only one vehicle 102 and one client device 120 is shown, it is contemplated that systems 100 could include many vehicles 102 and/or many client devices 120. As another example, while only a single cloud server 116 is shown, it should be noted that implementations may include more than one server, for load balancing or other networking purposes.

The vehicle 102 may include various types of automobile, crossover utility vehicle (CUV), sport utility vehicle (SUV), truck, recreational vehicle (RV), boat, jeepney, plane or other mobile machine for transporting people or goods. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. Some vehicles 102 may be operator controlled, while other vehicles 102 may be autonomously or semi-autonomously controlled. Some vehicles 102 may also have internet-of-things (IoT) features such as remote sentry mode.

The sensors 104 may include various devices configured to capture sensor data 106 of the vehicle 102 environment, as the operation of the autonomous, semi-autonomous, IoT, and other features may require the use of such sensor data 106. In an example, the sensors 104 may include visible light cameras or infrared cameras configured to capture still images and/or video data. In another example, the sensors 104 may include sensors configured to determine three-dimensional (3D) information and/or relative velocities, such as radio detection and ranging (RADAR) sensors or light detection and ranging (LiDAR) sensors. In another example, the sensors 104 may include sensors configured to measure contact force such as capacitive touch sensor. It should be noted that there may be other types of sensors 104 as well, such as global navigation satellite system (GNSS) location devices, audio capture devices, etc.

The sensor data 106 may be stored to a database, memory, or other storage 108 of the vehicle 102. In some cases, the sensor data 106 may be stored as a snapshot in time. In some cases, the sensor data 106 may be stored as time series data. In some instances, the sensors 104 may be configured to capture sensor data 106 of the surroundings of the vehicle 102. For instance, the sensors 104 may be configured to generate sensor data 106 of the roadway, of other vehicles 102, of pedestrians 110, or of obstacles. This sensor data 106 may be useful for driver assistance system, for autonomous driving systems, for a security camera device, for dash camera applications, and/or for recording driving data for recreation (e.g., track days, taking a picture such as a car selfie).

However, the capture of such sensor data 106 may involve the capture of PII. For instance, faces or other aspects of the pedestrians 110 may be captured in the sensor data 106. When combined with date/time and geolocation data, this sensor data 106 may be concerning, as it may both identify a person and also a location and time where the person was.

The TCU 112 may be configured to provide telematics services to the vehicle 102. These services may include, as some non-limiting possibilities, navigation, turn-by-turn directions, vehicle health reports, local business search, accident reporting, and hands-free calling. This may also include other data-driven services mentioned herein, such as autonomous driving, semi-autonomous driving, etc. The TCU 112 may accordingly be configured to utilize a transceiver to communicate with a communications network 114.

The communications network 114 may provide communications services, such as packet-switched network services (e.g., Internet access, voice over internet protocol (VOIP) communication services), to devices connected to the communications network 114. An example of a communications network 114 is a cellular telephone network. For instance, the TCU 112 may access the cellular network via connection to one or more cellular towers. To facilitate the communications over the communications network 114, the TCU 112 may be associated with unique device identifiers (e.g., mobile device numbers (MDNs), Internet protocol (IP) addresses, etc.) to identify the communications of the TCU 112 on the communications network 114 as being associated with the vehicle 102.

The cloud server 116 may be a computing device configured to communicate with the vehicles 102 over the communications network 114. The cloud server 116 may be configured to receive processed sensor data 118 from the vehicles 102.

The vehicle 102 may further include one or more notice devices 122. The notice devices 122 may include signs, loudspeakers, screens, or other device that may be used to provide notice of the capture of sensor data 106 to pedestrians 110 or other persons passing by the vehicle 102. For instance, signs may be affixed to the exterior of the vehicle 102 that state that the vehicle 102 is recording. Or, speakers may be provided that can be heard outside of the vehicle 102 to provide an audible message indicating that the vehicle 102 is recording. Or, one or more screens may be provided on the exterior of the vehicle that display a visual message indicating that the vehicle 102 is recording.

Figure 2:
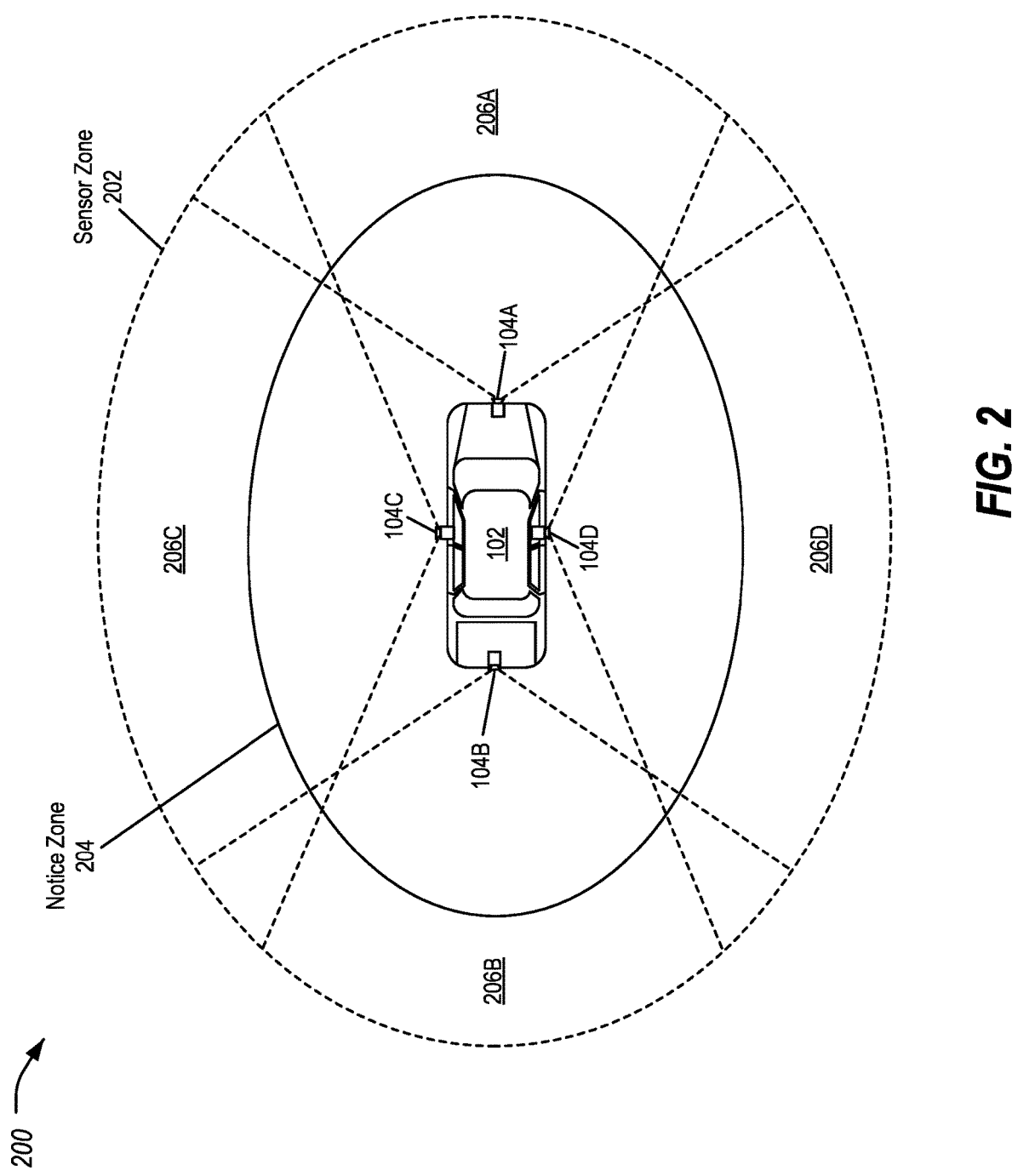
FIG. 2 illustrates an example illustrating a sensor zone and a notice zone surrounding the vehicle.

FIG. 2 illustrates an example 200 illustrating a sensor zone 202 and a notice zone 204 surrounding the vehicle 102. The sensor zone 202 refers to a region surrounding the vehicle 102 in which sensor data 106 may be captured by the sensors 104 of the vehicle 102. The notice zone 204 refers to a region surrounding the vehicle 102 in which the notice devices 122 may provide adequate notice to pedestrians 110.

As shown, the example vehicle 102 has four sensors 104, a front-facing sensor 104A having field-of-view 206A, a rear-facing sensor 104B having field-of-view 206B, a left-side sensor 104C having field-of-view 206C, and a right-side sensor 104D having field-of-view 206D. These fields-of-view 206A-206D collectively may combine to define the sensor zone 202. The sensor zone 202 may accordingly be defined based on the configuration of the hardware sensors 104 of the vehicle 102. It should be noted that this is merely an example, and vehicles 102 with more, fewer, and differently configured sensors 104 may be used. It should also be noted that the shapes of the sensor zone 202 and notice zone 204 are merely examples and may differ in different implementations.

In some examples, the vehicle 102 may adjust the boundary of the sensor zone 202 based on the conditions and/or parameters that reduce the effective operating distance of the sensors 104 to collect PII. For instance, for a camera sensor 104 the vehicle 102 may utilize a heuristic to identify the boundary, such as face PII requires 20×20 pixels which with a field-of-view 206 of X, a camera resolution of Y, and an average face per logical pixel size, would result in effective PII distance of Z. In another example, a minimum range may be established where objects would not be in focus. In yet another example, the sensor zone 202 may be reduced at night or in low visibility weather conditions. In yet another example, for a LiDAR sensor 104, a range may be identified where return signal would be unavailable based on weather visibility conditions.

The notice zone 204 may be defined based on the observability of the notice devices 122 by pedestrians 110 or other persons who may be detected by the sensors 104. For instance, an effective PII notice range may be established based on information on the capabilities of human senses or the ability to use recording devices such as cell phones to image a passing vehicle 102. In an example, a lookup table may be defined based on factors such as location, orientation, means of notification, ambient illumination, occlusion, etc.

TABLE 1

Notice Zone Lookup Table

| Vehicle Speed | View Angle | Ambient lighting | View Distance | Notification Valid |
|---|---|---|---|---|
| 0 mph | 0 | Day | 1 meter | True |
| 50 mph | 55 deg. | night | 5 meter | False |
| ... | ... | ... | ... | ... |

In another example, the notice zone 204 may be defined based on other standardized criteria. This standardized criterial may include laws or rules for the geographical area in which the vehicle 102 is located. For instance, a jurisdictional rule for a city may define the notice zone 204 as being within 30 feet of vehicle signage, regardless of the sensor 104 operating range or other factors. A database may be used to compile such jurisdictional rules for different vehicle locations. This may allow the vehicle 102 lookup the notice rules for the current location of the vehicle 102. For instance, the vehicle 102 may query the rules for the current location and may apply the notice rules for smaller jurisdictional boundaries including the vehicle location to override the notice rules for larger jurisdictional boundaries including the vehicle location. In one example, such a database may be maintained by the cloud server 116 to be queried over the communications network 114 by the vehicles 102. In another example, the database may be stored local in the storage 108 of the vehicle 102 itself.

Figure 3:
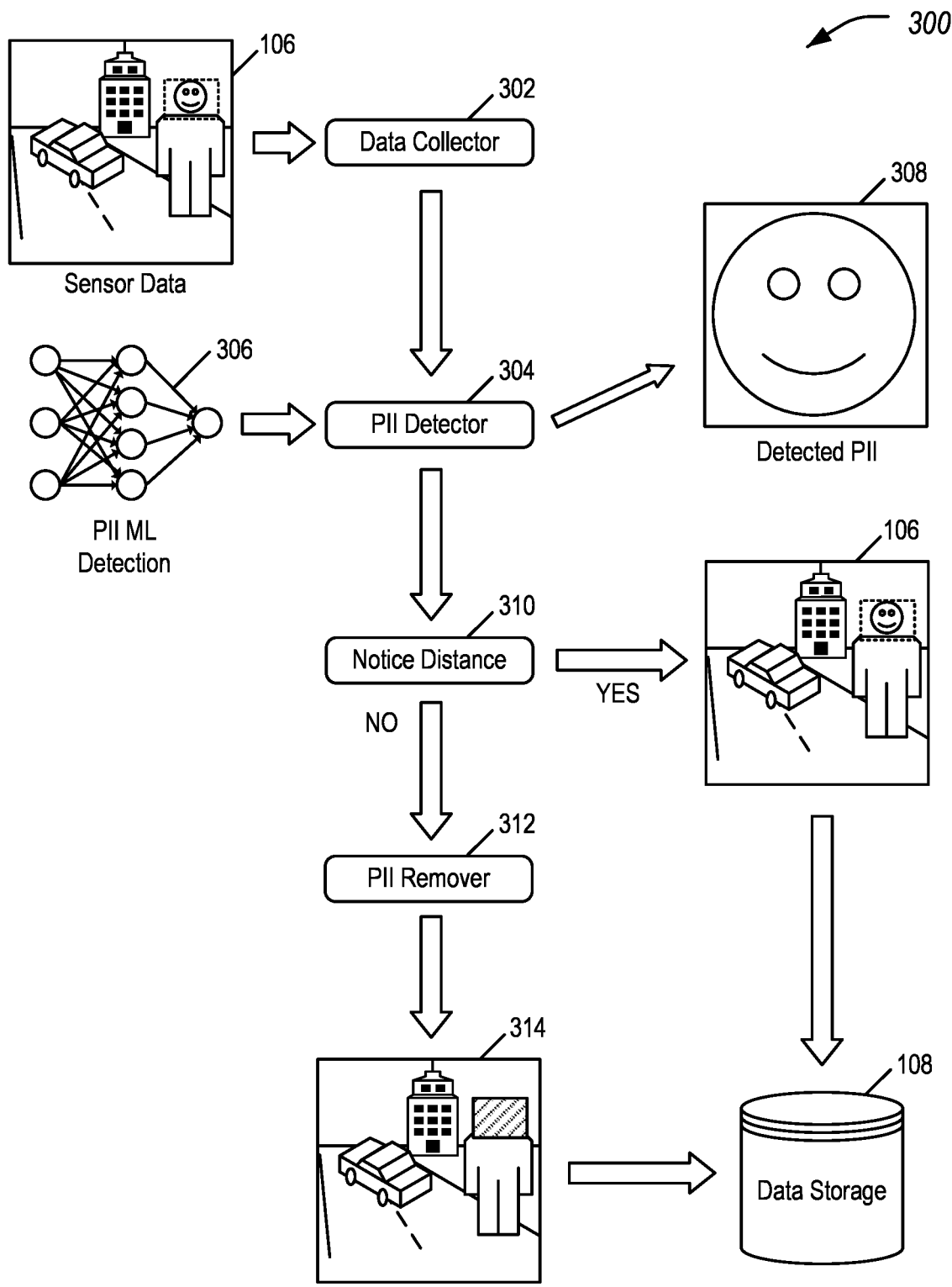
FIG. 3 illustrates an example data flow for the removal of PII from the sensor data.

FIG. 3 illustrates an example data flow 300 for the capture and removal of PII from the sensor data 106. As shown, a data collector 302 receives sensor data 106 including an original data stream from a sensor 104. In the illustrated example, the sensor data 106 is a video stream from a camera sensor 104 capturing image data with respect to surroundings of the vehicle 102.

A PII detector 304 is utilized to identify instances of PII in the sensor data 106. In an example, a PII neural network 306 configured to detect instances of PII in the sensor data 106 may be used to detect the PII regions. The PII neural network 306 may be trained to identify various aspects of PII. In an example, the PII neural network 306 may be configured to recognize faces in the sensor data 106. In another example, the PII neural network 306 may be configured to recognize license plates in the sensor data 106. In yet further examples, other sensor data (such as touch sensor data, vehicle location, etc.) alone or in combination may include detectable PII. In some examples, different PII neural network 306 may be trained to identify different classes of PII. Regardless of approach, the PII neural network 306 may be trained to identify the PII using a labeled data set of instances of PII in example sensor data 106. Once trained, the PII neural network 306 may be used to perform the identification task.

As shown the PII detector 304 identifies a pedestrian 110 is located in the video stream, and, in particular, the face of the pedestrian 110 is visible in the video stream. This face image is shown in magnified detail as detected PII 308, and represents an instance of PII in the sensor data 106.

A notice determiner 310 may be configured to identify the sensor zone 202 and the notice zone 204, as discussed with respect to FIG. 2. Based on those zones, the notice determiner 310 may determine whether the pedestrian 110 received notice from the notice devices 122. In an example, the notice determiner 310 may use the sensor data 106 to identify the location of the pedestrian 110. This location may be compared with the notice zone 204 to confirm whether the pedestrian 110 is inside the notice zone 204.

In another example, for visual notice devices 122, the notice determiner 310 may utilize the PII detector 304 on the sensor data 106 to identify whether the pedestrian 110 actually viewed the vehicle 102. If the face of the pedestrian 110 is detected as having viewed the vehicle 102, then this may be used as confirmation that the pedestrian 110 viewed the notice device 122.

Regardless of approach, if notice was received the sensor data 106 may be added to the storage 108. If not, a PII remover 312 may blur, blocked out, or otherwise made unintelligible the instances of detected PII 308 located in the sensor data 106. The result of the removal of the instances of PII is sanitized sensor data 314, as shown. The sanitized sensor data 314 may then be added to the storage 108.

While an exemplary modularization of components is described with here, it should be noted that functionality shown in FIG. 3 may be incorporated into more, fewer or different arranged components. For instance, while many of the components are described separately, aspects of these components may be implemented separately or in combination by one or more controllers, such as the TCU 112, in hardware and/or a combination of software and hardware.

Figure 4:
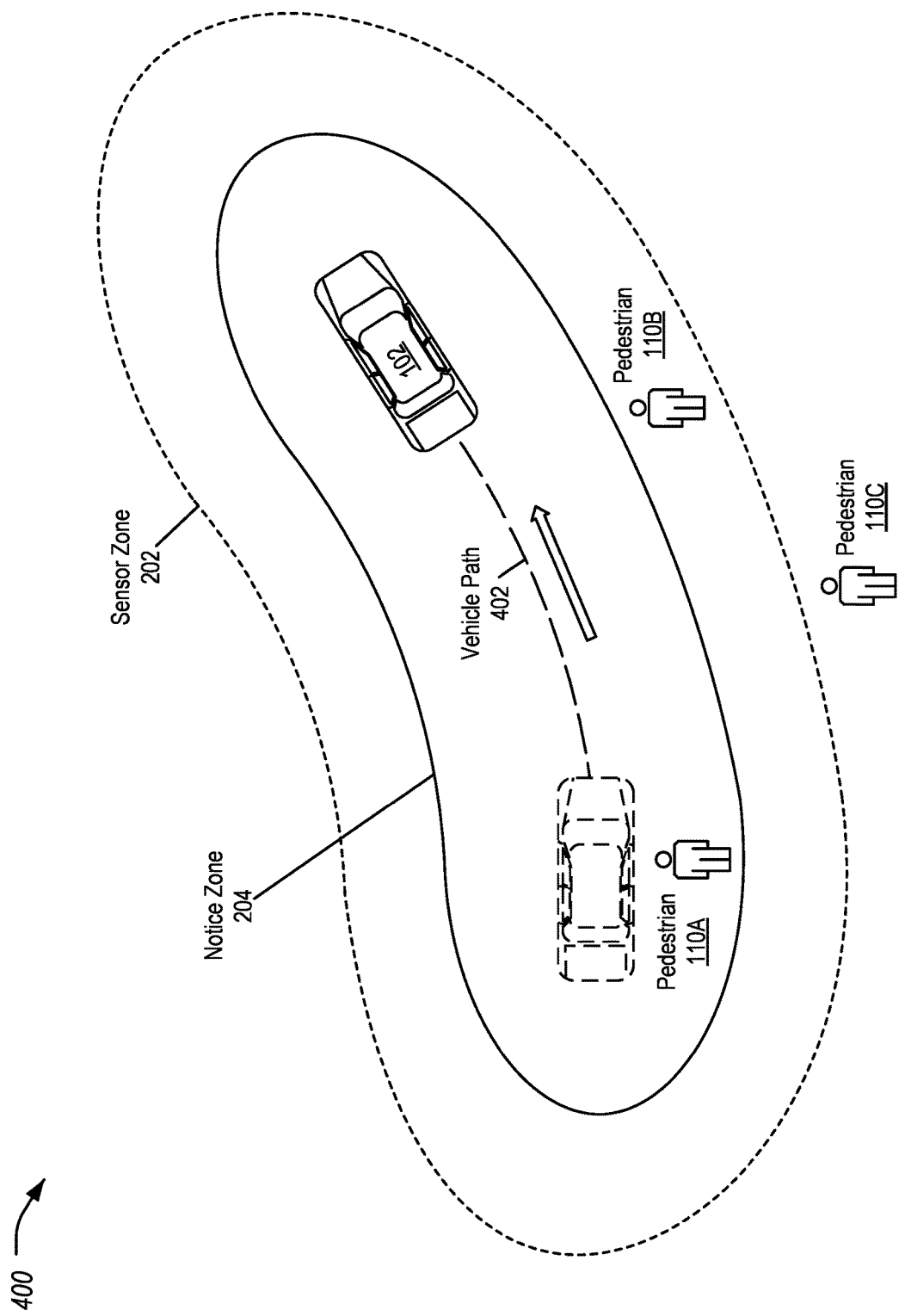
FIG. 4 illustrates an example of pedestrians at different distances from a vehicle.

FIG. 4 illustrates an example 400 of three stationary pedestrians 110A, 110B, 110C at different distances from a moving vehicle 102. The vehicle 102 is shown as having traversed a vehicle path 402 from a start location to a current location. The combined notice zone 204 and sensor zone 202 over time are also illustrated. This is because, in this example 400, if the pedestrian 110 has received notice at any point along the vehicle path 402, the pedestrian 110 is considered to have received notice for any captured sensor data 106 along the vehicle path 402.

The first pedestrian 110A is within the notice zone 204 and the sensor zone 202. Thus, the notice determiner 310 may conclude that the first pedestrian 110A received notice and that any detected PII 308 in the sensor data 106 with respect to the pedestrian 110A may remain. The sensor data 106 may accordingly be provided to the storage 108.

The second pedestrian 110B is outside the notice zone 204 but within the sensor zone 202. Thus, the notice determiner 310 may conclude that the second pedestrian 110B did not notice and that any detected PII 308 in the sensor data 106 with respect to the pedestrian 110B should be obscured by the PII remover 312. The sanitized sensor data 314 may then be provided to the storage 108.

The third pedestrian 110C is outside the notice zone 204 and the sensor zone 202. Thus, no data about the third pedestrian 110C is captured or maintained.

Figure 5:
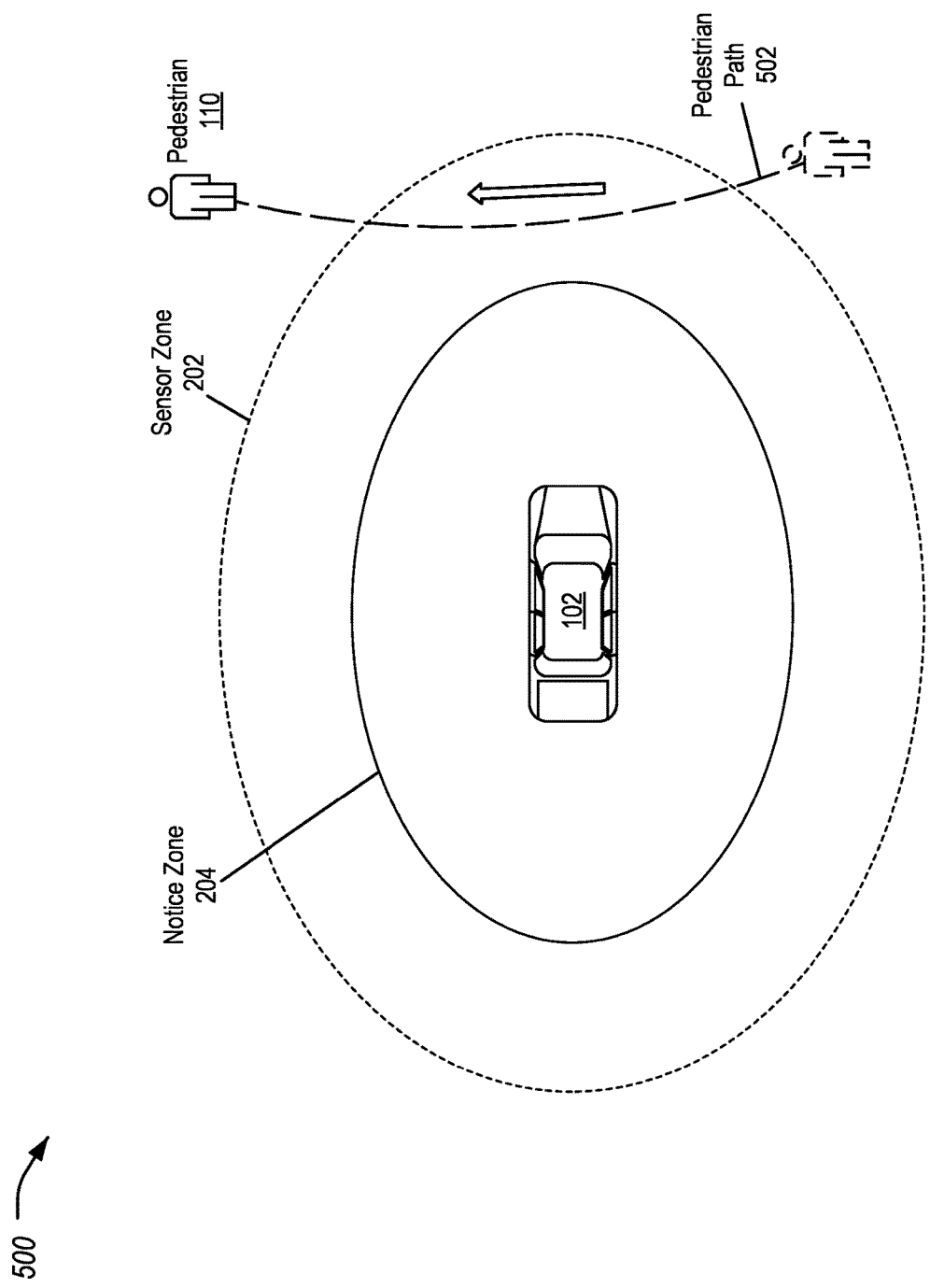
FIG. 5 illustrates an example of a moving pedestrian walking past a stationary vehicle.

FIG. 5 illustrates an example 500 of a moving pedestrian 110 walking past a stationary vehicle 102. In this example 500, the pedestrian 110 is shown as having traversed a pedestrian path 502 passing into the sensor zone 202, but not into the notice zone 204. In this example, the pedestrian 110 has not received notice. Thus, the notice determiner 310 may conclude that any detected PII 308 in the sensor data 106 with respect to the pedestrian 110 should be obscured by the PII remover 312. The sanitized sensor data 314 may then be provided to the storage 108.

Figure 6:
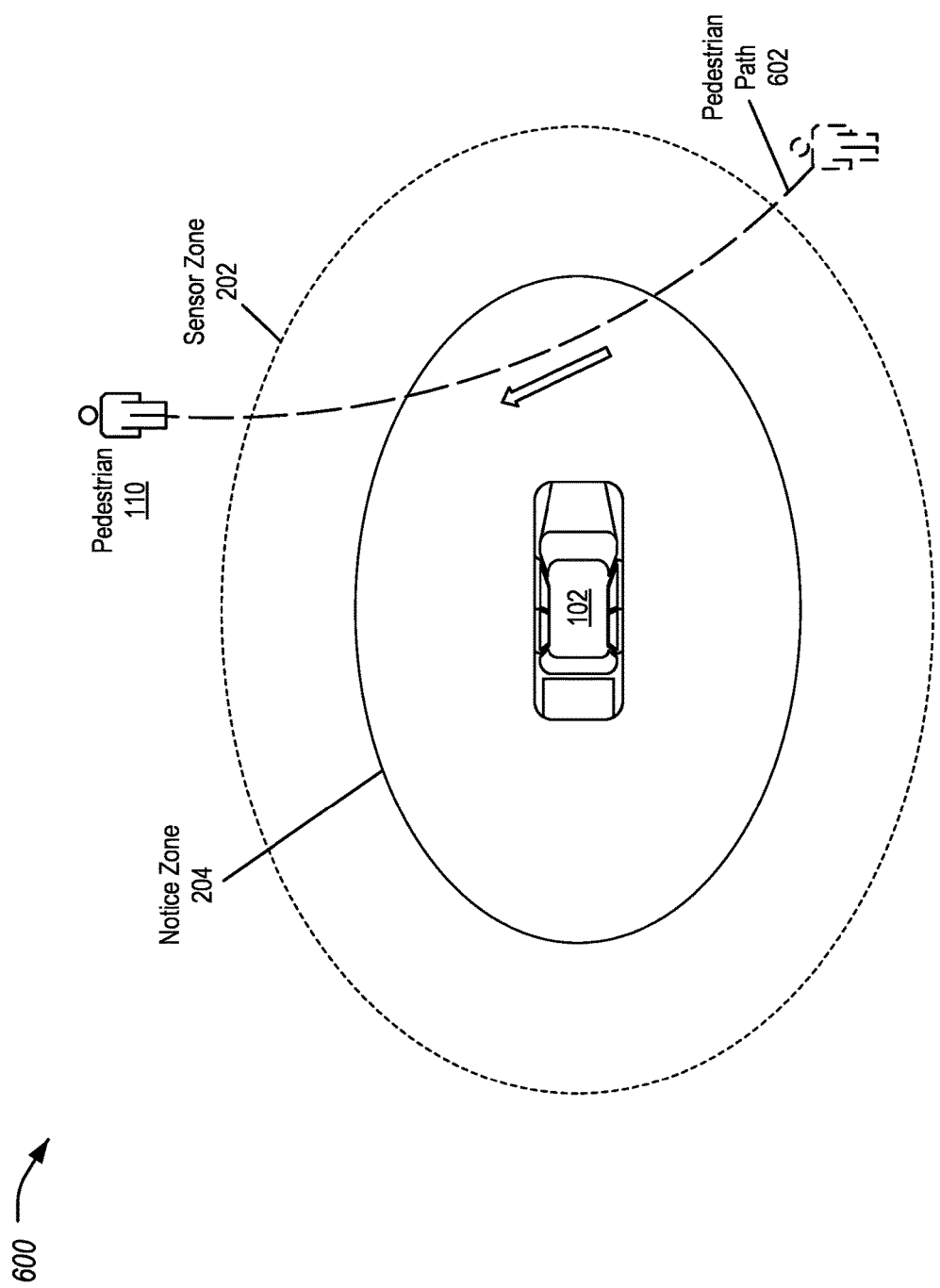
FIG. 6 illustrates an alternate example of a moving pedestrian walking past a stationary vehicle.

FIG. 6 illustrates an alternate example 600 of a moving pedestrian 110 walking past a stationary vehicle 102. In this example 600, the pedestrian 110 is shown as having traversed a pedestrian path 602 passing into both the sensor zone 202, and also into the notice zone 204. In this example, the pedestrian 110 has received notice. Thus, the notice determiner 310 may conclude that any detected PII 308 in the sensor data 106 with respect to the pedestrian 110, whether captured inside or outside the notice zone 204, is approved to be included in the sensor data 106 provided to the storage 108.

Figure 7:
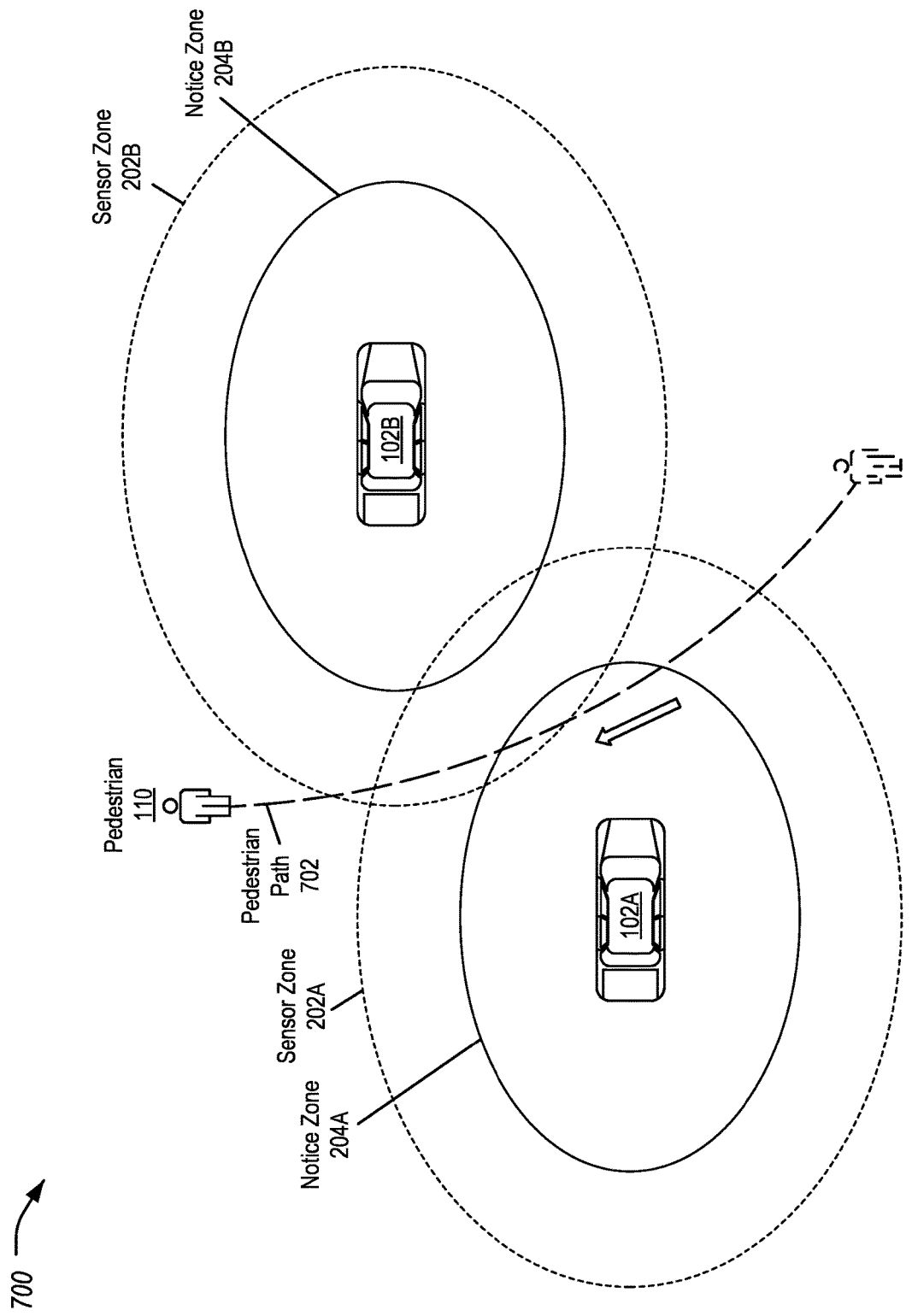
FIG. 7 illustrates an example of a moving pedestrian walking past multiple stationary vehicles.

FIG. 7 illustrates an example 700 of a moving pedestrian 110 walking past two stationary vehicles 102A and 102B. In the example, the stationary vehicles 102A and 102B may be in wireless communication to cooperate in capturing sensor data 106 for the area. In this example 700, the pedestrian 110 is shown as having traversed a pedestrian path 702 passing into the sensor zone 202A and the notice zone 204A of the first vehicle 102A, and into the sensor zone 202B but not the notice zone 204B of the second vehicle 102B. In this example, the pedestrian 110 has received notice from one of the vehicles 102A-102B. Thus, the notice determiner 310 of each of vehicles 102A and 102B may collectively conclude, that any detected PII 308 in the sensor data 106 with respect to the pedestrian 110, whether before or after the notice is provided, is allowed to be provided to the storage 108.

Figure 8:
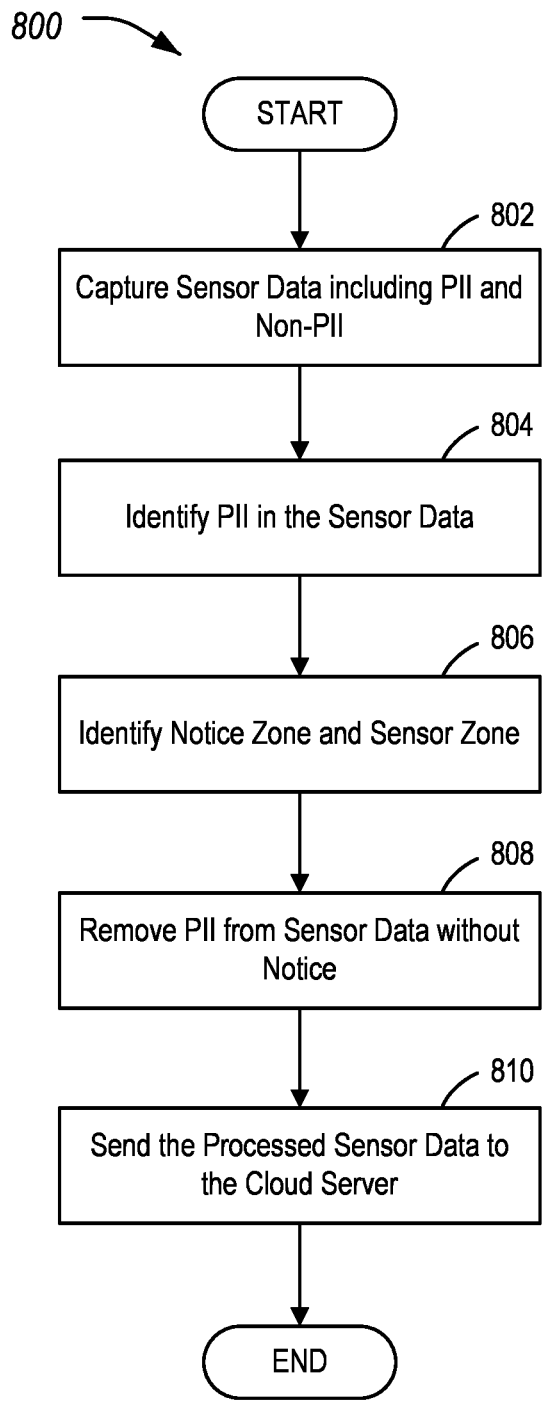
FIG. 8 illustrates an example process for the acquisition of data and adaptive obscuring of PII based on data collection notice.

FIG. 8 illustrates an example process 800 for the acquisition of data and adaptive obscuring of PII based on data collection notice. In an example, the process 800 may be performed by one or more controllers of the vehicle 102. It should be noted that while the process 800 is illustrated linearly, one or more operations of the process 800 may be performed concurrently, and/or the process 800 may be performed continuously in a loopwise manner.

At operation 802, the vehicle 102 captures sensor data 106. In an example, the vehicle 102 may receive sensor data 106 from the sensors 104 of the roadway, other vehicles 102, pedestrians 110, or obstacles. The sensor data 106 may include PII as well as non-PII.

At operation 804, the vehicle 102 identifies PII in the sensor data 106. In an example, the vehicle 102 may use one or more PII neural networks 320 to identify PII in the sensor data 106. In an example, the PII neural network 320 may be configured to recognize faces in the sensor data 106. In another example, the PII neural network 320 may be configured to recognize license plates in the sensor data 106. In some examples, different PII neural network 320 may be trained to identify different types of PII.

At operation 806, the vehicle 102 identifies the notice zone 204 and the sensor zone 202 with respect to the vehicle 102. In an example, the sensor zone 202 may be defined as the collective sum of the fields-of-view 206 of the sensors 104 of the vehicle 102. In some examples, the vehicle 102 may adjust the boundary of the sensor zone 202 based on the conditions and/or parameters that reduce the effective operating distance of the sensors 104 to collect PII. In an example, the notice zone 204 may be defined based on the observability of the notice devices 122 by pedestrians 110 or other persons who may be detected by the sensors 104. For instance, an effective PII notice range may be established using a lookup table lookup table based on factors such At operation 808, the vehicle 102 removes PII from the sensor data 106. For instance, the instances of PII located in the sensor data 106 by the PII detector 304 that are outside the notice zone 204 may be blurred, blocked out, or otherwise made unintelligible. This removal may be done across the time series of sensor data 106. For instance, if a pedestrian 110 has notice in one frame of the sensor data 106, then the PII may be retained across the sensor data 106, but if the pedestrian 110 does not have notice across the data, then the PII may be obscured across the sensor data 106. The result of the removal of the instances of PII is processed sensor data 118 that includes either the sensor data 106 as captured or the sanitized sensor data 314.

At operation 810, the vehicle 102 sends the processed sensor data 118 to the cloud server 116. After operation 810, the process 800 ends. The cloud server 116 may accordingly make the processed sensor data 118 available for querying by the client devices 120. After operation 810, the process 800 ends. It should be noted that the processing may run in the background indefinitely on the vehicle 102 on data segments as they are captured (e.g., for sentry mode).

Figure 9:
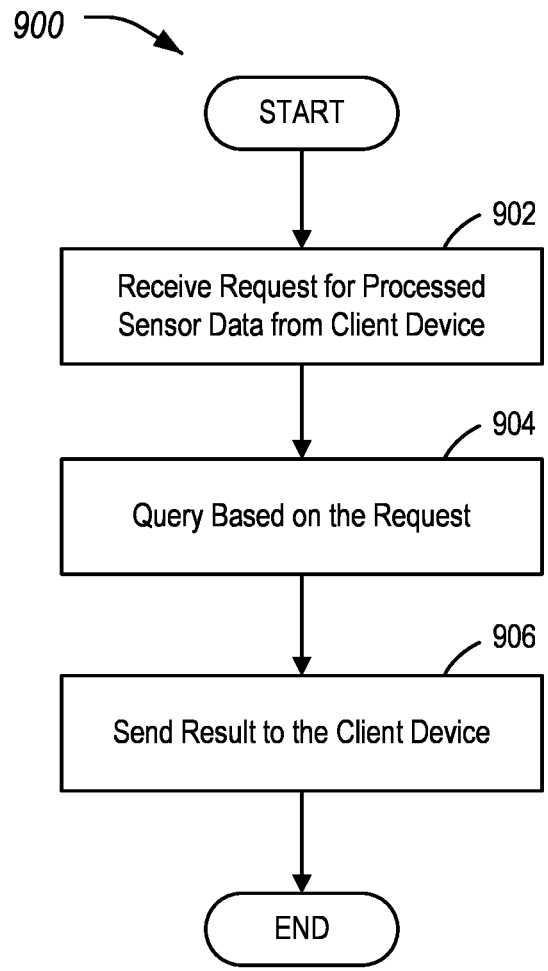
FIG. 9 illustrates an example process for the querying of processed sensor data.

FIG. 9 illustrates an example process 900 for the querying of processed sensor data 118. In an example, the process 900 may be performed by a client device 120 in the context of the system 100. It should be noted that while the process 900 is illustrated linearly, one or more operations of the process 900 may be performed concurrently, and the process 900 may be performed concurrently responsive to multiple requests from client devices 120.

At operation 902, the cloud server 116 receives a request for processed sensor data 118 from a client device 120. In an example, the client device 120 may send a request for information with respect to developing and debugging driver assistance or autonomous driving systems. In another example, the client device 120 may send a request for information with respect to a DTC. In another example, a vehicle owner or fleet operator may request data with respect to a specific location.

At operation 904, the cloud server 116 queries the stored processed sensor data 118 for the information specified by the request. The result of the query may be a data set including the requested processed sensor data 118.

At operation 906, the cloud server 116 sends the result to the client device 120. After operation 906, the process 900 ends. Accordingly, by using the process 900, the client device 120 may receive a version of the sensor data 106 including all PII that was noticed, with obfuscation of any PII of pedestrians where notice was not provided.

Figure 10:
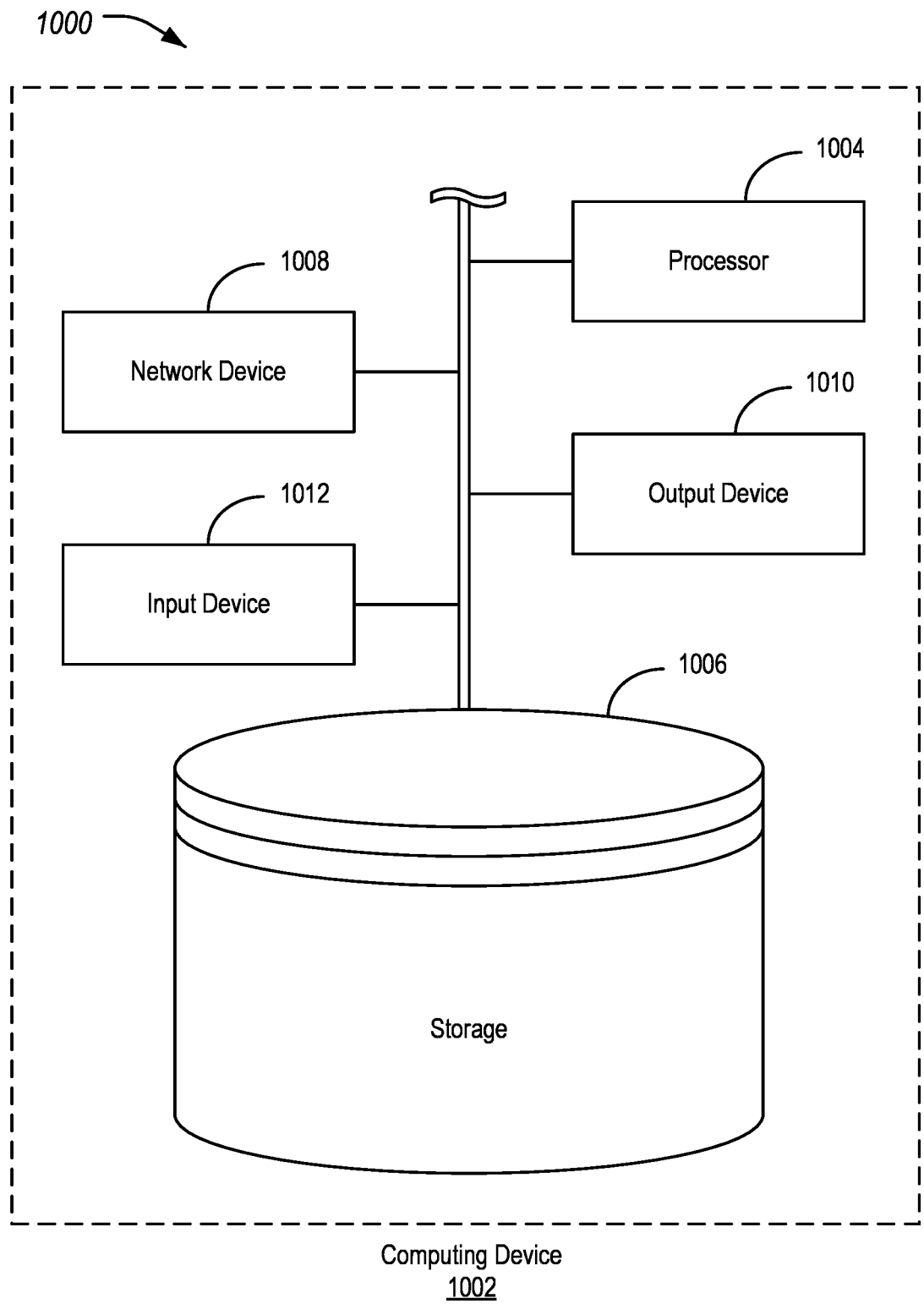
FIG. 10 illustrates an example of a computing device for the acquisition and handling of PII and non-PII data.

FIG. 10 illustrates an example 1000 of a computing device 1002 for the acquisition and handling of PII and non-PII data. Referring to FIG. 10, and with reference to FIGS. 1-9, the TCU 112, cloud server 116, and client devices 120, may be examples of such computing devices 1002. As shown, the computing device 1002 includes a processor 1004 that is operatively connected to a storage 1006, a network device 1008, an output device 1010, and an input device 1012. It should be noted that this is merely an example, and computing devices 1002 with more, fewer, or different components may be used.

The processor 1004 may include one or more integrated circuits that implement the functionality of a central processing unit (CPU) and/or graphics processing unit (GPU). In some examples, the processors 1004 are a system on a chip (SoC) that integrates the functionality of the CPU and GPU. The SoC may optionally include other components such as, for example, the storage 1006 and the network device 1008 into a single integrated device. In other examples, the CPU and GPU are connected to each other via a peripheral connection device such as peripheral component interconnect (PCI) express or another suitable peripheral data connection. In one example, the CPU is a commercially available central processing device that implements an instruction set such as one of the x86, ARM, Power, or microprocessor without interlocked pipeline stage (MIPS) instruction set families.

Regardless of the specifics, during operation the processor 1004 executes stored program instructions that are retrieved from the storage 1006. The stored program instructions, accordingly, include software that controls the operation of the processors 1004 to perform the operations described herein. The storage 1006 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally 3D graphics to the output device 1010. The output device 1010 may include a graphical or visual display device, such as an electronic display screen, projector, printer, or any other suitable device that reproduces a graphical display. As another example, the output device 1010 may include an audio device, such as a loudspeaker or headphone. As yet a further example, the output device 1010 may include a tactile device, such as a mechanically raiseable device that may, in an example, be configured to display braille or another physical output that may be touched to provide information to a user.

The input device 1012 may include any of various devices that enable the computing device 1002 to receive control input from users. Examples of suitable input devices that receive human interface inputs may include keyboards, mice, trackballs, touchscreens, voice input devices, graphics tablets, and the like.

The network devices 1008 may each include any of various devices that enable the TCU 112, cloud server 116, and client devices 120 to send and/or receive data from external devices over networks. Examples of suitable network devices 1008 include an Ethernet interface, a Wi-Fi transceiver, a cellular transceiver, or a BLUETOOTH or BLUETOOTH low energy (BLE) transceiver, ultra-wide-band (UWB) transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as application specific integrated circuit (ASIC), field-programmable gate array (FPGA), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, case of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle for handling personally identifiable information (PII) in data streams, comprising:

a sensor configured to capture sensor data over time of an environment surrounding the vehicle, the sensor data including captured PII and non-PII;
a notice device configured to provide notice to pedestrians that the sensor data is being captured; and
a processor, in communication with the sensor and the notice device, programmed to
identify the captured PII in the sensor data,
identify a notice zone surrounding the vehicle in which the notice device provides the notice,
obscure any instances of the captured PII in the sensor data captured from the pedestrians that, over the time of the capture, did not enter the notice zone and receive the notice, and
send the sensor data, as processed, to a cloud server for storage.

2. The vehicle of claim 1, wherein the processor is further programmed to utilize a PII detector to identify the captured PII using one or more neural networks trained to identify the captured PII in the sensor data.

3. The vehicle of claim 2, wherein the one or more neural networks includes a neural network configured to identify faces in the sensor data.

4. The vehicle of claim 3, wherein the processor is further programmed to utilize the PII detector to confirm, based on the sensor data, whether the pedestrians actually viewed the vehicle by confirming that faces of the pedestrians are detected in the sensor data.

5. The vehicle of claim 1, wherein the notice device includes one or more of:
signage on the exterior of the vehicle indicating that the vehicle is capturing the sensor data;
a screen on the exterior of the vehicle indicating that the vehicle is capturing the sensor data; or
a screen on the interior of the vehicle visible from the exterior and indicating that the vehicle is capturing the sensor data.

6. The vehicle of claim 1, wherein the notice device includes a loudspeaker broadcasting audio outside of the vehicle, the audio indicating that the vehicle is capturing the sensor data.

7. The vehicle of claim 1, wherein the vehicle is in communication with a second vehicle configured to capture the sensor data over the time and provide the notice in a second notice zone, wherein vehicles, in combination, are programmed to obscure any instances of the captured PII in the sensor data captured from the pedestrians that, over the time of the capture, did not enter either the notice zone or the second notice zone.

8. A method for handling personally identifiable information (PII) in data streams, comprising:
identifying captured PII in sensor data, the sensor data being captured over time by a sensor of a vehicle of an environment surrounding the vehicle, the sensor data including captured PII and non-PII;
identifying a notice zone surrounding the vehicle, the notice zone defining an area in which a notice device of the vehicle provides notice to pedestrians that the sensor data is being captured;
obscuring any instances of the captured PII in the sensor data captured from the pedestrians that, over the time of the capture, did not enter the notice zone and receive the notice; and
sending the sensor data, as processed, to a cloud server for storage.

9. The method of claim 8, further comprising utilizing a PII detector to identify the captured PII using one or more neural networks trained to identify the captured PII in the sensor data.

10. The method of claim 9, wherein the one or more neural networks includes a neural network configured to identify faces in the sensor data.

11. The method of claim 10, further comprising utilizing the PII detector to confirm, based on the sensor data, whether the pedestrians actually viewed the vehicle by confirming that faces of the pedestrians are detected in the sensor data.

12. The method of claim 8, wherein the vehicle is in communication with a second vehicle configured to capture the sensor data over the time and provide the notice in a second notice zone, and further comprising obscuring any instances of the captured PII in the sensor data captured from the pedestrians that, over the time of the capture, did not enter either the notice zone or the second notice zone.

13. The method of claim 8, further comprising:
receiving a query for processed sensor data from a client device; and
sending the processed sensor data matching the query to the client device, the matching processed sensor data including all PII that was noticed, with obfuscation of any PII where notice was not provided.

14. A non-transitory computer-readable medium comprising instructions for handling personally identifiable information (PII) in data streams that, when executed by a controller of a vehicle, cause the controller to perform operations including to:
utilize a sensor to capture sensor data over time of an environment surrounding the vehicle, the sensor data including captured PII and non-PII;
utilize a notice device to provide notice to pedestrians that the sensor data is being captured;
identify the captured PII in the sensor data;
identify a notice zone surrounding the vehicle in which the notice device provides the notice;
obscure any instances of the captured PII in the sensor data captured from the pedestrians that, over the time of the capture, did not enter the notice zone and receive the notice; and
send the sensor data, as processed, to a cloud server for storage.

15. The medium of claim 14, further comprising instructions that, when executed by the controller, cause the controller to perform operations including to utilize a PII detector to identify the captured PII using one or more neural networks trained to identify the captured PII in the sensor data.

16. The medium of claim 15, wherein the one or more neural networks includes a neural network configured to identify faces in the sensor data.

17. The medium of claim 16, further comprising instructions that, when executed by the controller, cause the controller to perform operations including to utilize the PII detector to confirm, based on the sensor data, whether the pedestrians actually viewed the vehicle by confirming that faces of the pedestrians are detected in the sensor data.

18. The medium of claim 14, wherein the notice device includes one or more of:
signage on the exterior of the vehicle indicating that the vehicle is capturing the sensor data;
a screen on the exterior of the vehicle indicating that the vehicle is capturing the sensor data; or a screen on the interior of the vehicle visible from the exterior and indicating that the vehicle is capturing the sensor data.

19. The medium of claim 14, wherein the notice device includes a loudspeaker broadcasting audio outside of the vehicle, the audio indicating that the vehicle is capturing the sensor data.

20. The medium of claim 14, wherein the vehicle is in communication with a second vehicle configured to capture the sensor data over the time and provide the notice in a second notice zone, and further comprising instructions that, when executed by the controller and a controller of the second vehicle, cause the controller and the second controller to collectively perform operations including to obscure any instances of the captured PII in the sensor data captured from the pedestrians that, over the time of the capture, did not enter either the notice zone or the second notice zone.

* * * * *